United States Patent [19]

Goldenberg et al.

[11] Patent Number: 4,773,731
[45] Date of Patent: Sep. 27, 1988

[54] ONE-PIECE PROJECTION SCREEN

[75] Inventors: Jill F. Goldenberg, Pelham Manor, N.Y.; Ralph H. Bradley, Jr., Kingsport; William F. Guerinot, Knoxville, both of Tenn.; Thomas S. McKechnie, Ossining, N.Y.

[73] Assignee: North American Philips Corp., New York, N.Y.

[21] Appl. No.: 90,487

[22] Filed: Aug. 28, 1987

[51] Int. Cl.[4] .............................................. G03B 21/60
[52] U.S. Cl. .................................................... 350/128
[58] Field of Search ....................... 350/117, 126–129, 350/167

[56] References Cited

U.S. PATENT DOCUMENTS 4,053,208 10/1977 Kato et al. ........................... 350/117
4,679,900 7/1987 McKechnie et al. ................ 350/126

Primary Examiner—Richard A. Wintercorn
Attorney, Agent, or Firm—Gregory P. Gadson

[57] ABSTRACT

A one-piece projection screen with improved overall efficiency and contrast, the elimination of corner illumination deficiencies and undesirable image artifacts. The optical power of the screen is divided between two or more surfaces acting as Fresnel lenses, and the region or medium separating the surfaces has a different index of refraction than that of the mediums upstream or downstream of the surfaces. The preferred embodiment of the projection screen includes a diffuser and a lenticular array downstream of the surfaces.

9 Claims, 4 Drawing Sheets

ONE-PIECE PROJECTION SCREEN

BACKGROUND OF THE INVENTION

This invention relates generally to projection screens. More specifically, the present invention relates to rear projection screens capable of use in a projection television (PTV) display arrangement.

Typical PTV display arrangements contain means for converting a video signal into an optical image. The optical image is projected upon a screen for viewing by an observer. In the case where the projection distance is relatively small, such as in compact PTV systems, the prior art arrangements are deficient.

Some prior art arrangements have an inherent lower optical efficiency near the outer edges of the screen or corner illumination problems, resulting in a "bright spot" in the center. Efficiency may be defined to be the ratio of the total amount of light which passes through the screen to the total amount of incident light received by the screen. Other prior art arrangements have attempted to improve the quality of the system by eliminating the bright spot effect. While these arrangements may have eliminated corner illumination problems, the overall efficiency of the screen and the contrast are reduced. Additionally, undesirable artifacts may be visible to the observer.

SUMMARY OF THE INVENTION

Accordingly, it is an object of this invention to provide an efficient projection screen without corner illumination deficiencies.

Another object of this invention is to provide a projection screen with improved overall efficiency and contrast.

A further object of this invention is to provide a projection screen which displays an image free of artifacts.

Yet another object of this invention is to provide a projection screen that achieves all of the above objects in a simple embodiment.

The foregoing and other objects of the present invention are realized by forming a one-piece projection screen which splits the optical power of the screen's field lens between more than one surface, each surface acting as a Fresnel lens. The index of refraction of the material between the surfaces (two in the preferred embodiment) is different from that of the mediums either upstream of the first surface, or downstream of the second surface.

BRIEF DESCRIPTION OF THE DRAWINGS

The foregoing and other objects and features of the present invention will be apparent from the specification, the drawings and the two combined. The drawings (not drawn to scale) are briefly.

DETAILED DESCRIPTION OF THE INVENTION

Figure 1:
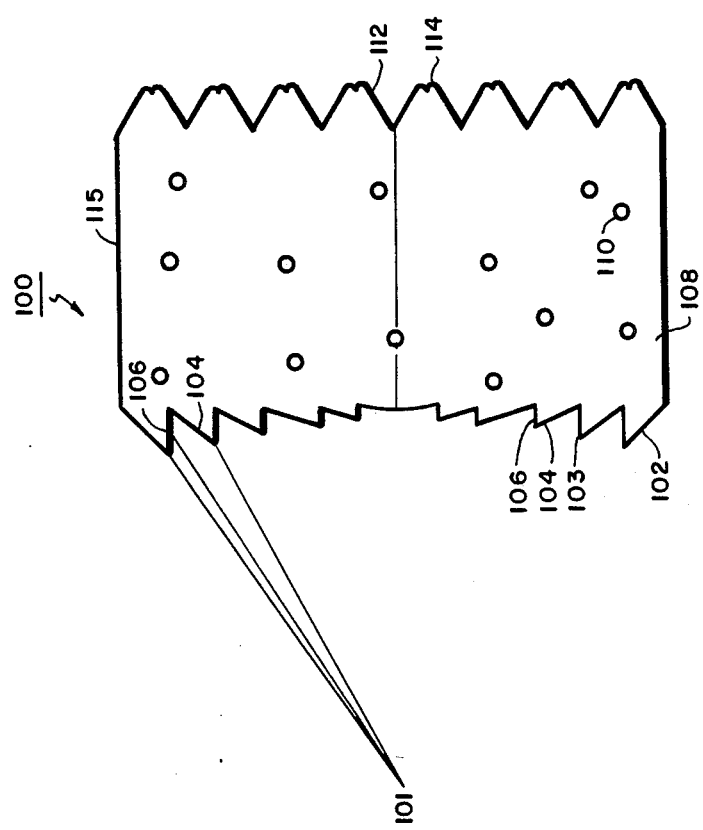
FIG. 1 is a horizontal cross-sectional representation of a one-piece projection screen having a single Fresnel lens.

FIG. 1 shows a projection screen 100 usable in, for example, a PTV system. The field lens 102 in the screen 100 may have a short focal length—typical of projection screens used in compact PTV systems. Light comprising the image to be displayed emanates from a projection lens or image source 101. The light rays from source 101 are converted to parallel rays by a Fresnel lens also serving as the field lens 102 which has facets 103. The screen 100 may additionally contain a screen base 115 having a diffuser 108 with diffuser elements 110 which controls the spread of the light in the vertical direction to a cone angle of 11°, for example, and a lenticular array 112 containing lenticules 114 that permits efficient wide-angle viewing (a horizontal cone angle of 170° for example). The facets 103 refract light received to form the parallel or collimated rays that impinge upon the diffuser and lenticules.

While the facet surfaces 104 are primarily responsible for refraction in the Fresnel lens 102, the facet surfaces 106 primarily cause a loss of efficiency of the screen 100 because light impinging on these surfaces is misdirected or lost. As can be seen from FIG. 1, the facets 103 located at the perimeter of the Fresnel lens 102 have larger surfaces than the facets 103 towards the center. This is a necessary limitation since the amount of refraction required to convert divergent rays from a point source of light into parallel rays at a given location on the Fresnel lens is directly proportional to the distance from the center of the lens to the given location.

Because the facet surfaces 106 are larger near the edges of the lens 102, a greater portion of light is misdirected, resulting in decreased luminance near the edges, thus giving the lens a "bright spot" effect in its center.

Figure 2:
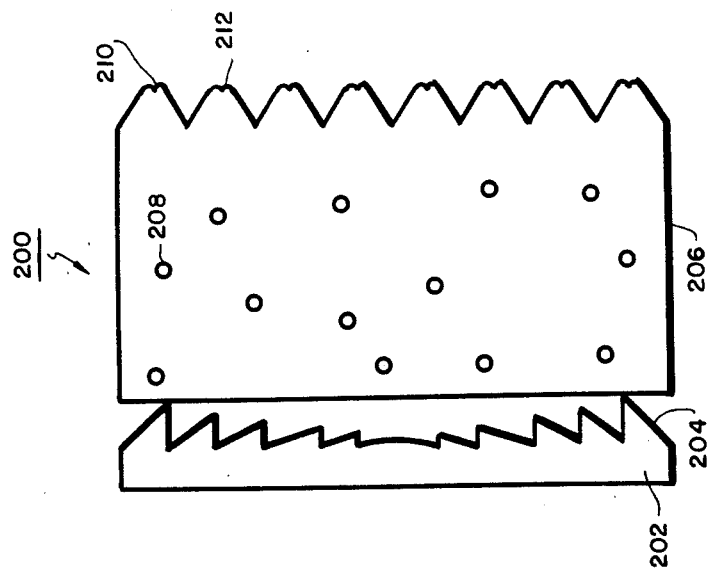
FIG. 2 is a horizontal cross-sectional representation of a two-piece projection screen.

The projection screen 200 in FIG. 2 eliminates the edge luminance reduction problems of the projection screen 100 in FIG. 1 by a separation of its field lens 202, which contains a Fresnel lens 204, from the remainder of the screen. The Fresnel lens 204 converts the rays from the light source into parallel rays just as the Fresnel lens 102. However, the incidents of misdirected light are greatly reduced, so that no "bright spot" appears at the center. Two of the penalties associated with the embodiment of FIG. 2—and hence the drawbacks—are an approximate 16% reduction in the screen's efficiency, and the introduction of disturbing artifacts.

Figure 3:
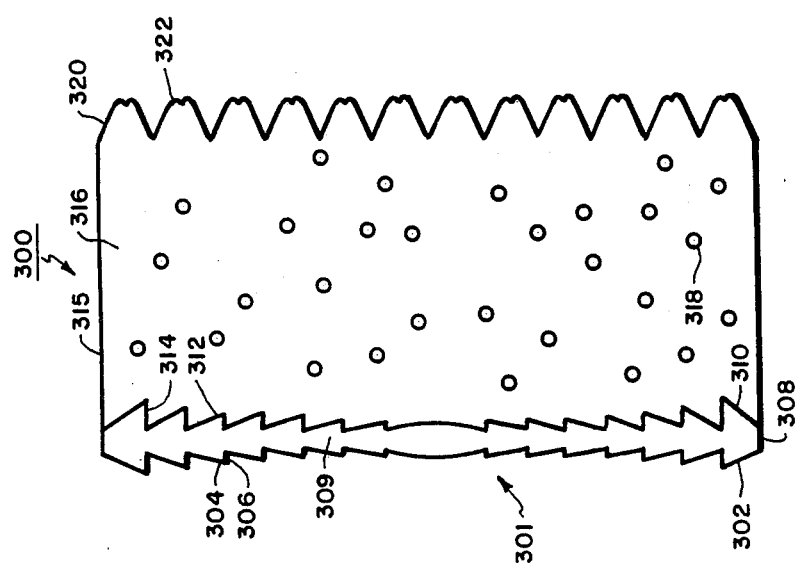
FIG. 3 is a horizontal cross-sectional representation of the preferred embodiment of the one-piece projection screen of the present invention.

The projection screen 300 shown in FIG. 3 greatly reduces the edge luminance fall-off problem associated with the screen 100, while avoiding the large efficiency loss penalty associated with the screen 200 and the number of disturbing artifacts. The field lens 308 contains two Fresnel lenses 302 and 310 separated by a region or medium with an index of refraction different from that of either the diffuser 316 or the incident medium 301. The region 309 is for example filled with U.V. curing polymer having an index of refraction n of approximately 1.59. The diffuser 316 may be of polymethylmethacrylate (PMMA) material with n approximately equal to 1.49.

The addition of the second Fresnel lens 310 has the effect of dividing the required optical power of the field lens 308 between the two Fresnel lenses. Thus, the facet surfaces 306 and 314 are smaller than corresponding facet surfaces in FIG. 1, resulting in less misdirected light.

Figure 4:
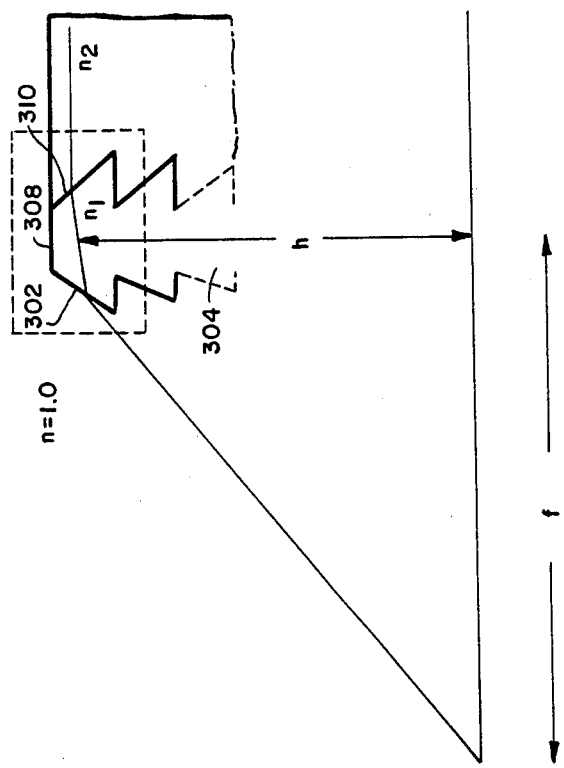
FIG. 4 is a geometry for the field lens of the projection screen in FIG. 3.
Figure 5:
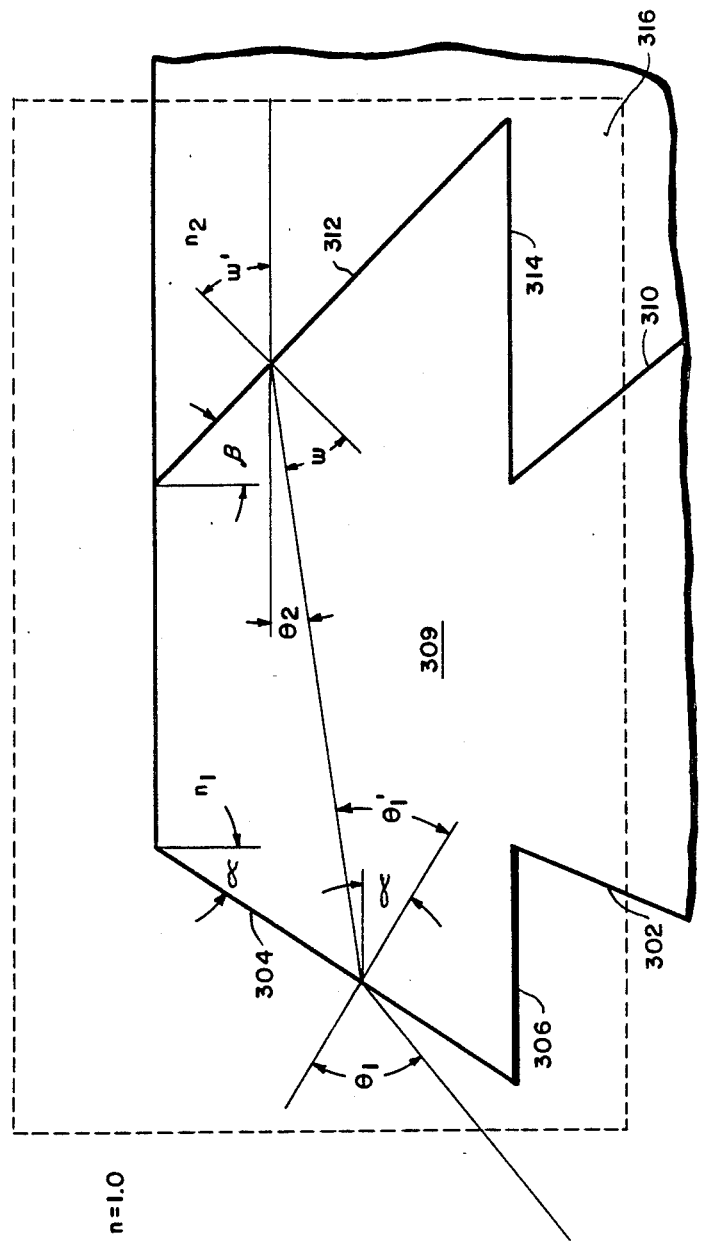
FIG. 5 is an expanded view of a portion of FIG. 4.

The facet angles of the two Fresnel lenses 302 and 310 can be calculated as follows, with reference to FIGS. 4 and 5. In the preferred embodiment the optical power of the field lens 308 is evenly divided between surfaces 302 and 310, and the distance across the region 309 between the surfaces 302 and 310 is small. Therefore the optical power of each surface is 1/2 f, where f is the focal length of the field lens 308. The facet angle $\alpha$ on surface 302 is given by the following equation $$\tan(\alpha) = \frac{\sin(\phi)}{n_1 - \cos(\phi)} \quad (1a)$$

$$\text{where } \phi = \tan^{-1}\left(\frac{h}{2f}\right), \quad (1b)$$

h being the distance from the optical center of the lens 308 to the facet, and $n_1$, being the refractive index of region 309. A ray incident on facet surface 304 makes an angle $\theta_1$, with the normal, such that $$\theta_1 = \tan^{-1}\left(\frac{h}{f}\right) + \alpha \quad (2)$$

The angle of the refracted ray $\theta_1'$ is found by using Snell's Law:

$$\theta_1' = \sin^{-1}\left(\frac{\sin(\theta_1)}{n_1}\right) \quad (3)$$

The angle of the refracted ray measured with respect to the optical axis $\theta_2$, is given by $$\theta_2 = \theta_1' - \alpha \quad (4)$$

The angle of this ray with respect to normal of facet surface 312 is $$\omega = \beta - \theta_2, \quad (5)$$

where the facet angle $\beta$ is the angle needed to collimate the ray. Snell's Law predicts the refraction angle $\omega'$ as $$\omega' = \sin^{-1}\left[\frac{n_1 \sin(\omega)}{n_2}\right], \quad (6)$$

where $n_2$ is the refractive index for the region 316. To collimate the ray after refraction, $\omega'' - \beta$ must equal zero. Therefore, $$\sin^{-1}\left[\frac{n_1 \sin(\beta - \theta_2)}{n_2}\right] - \beta = 0 \quad (7)$$

The facet angle $\beta$ of facet surface 312 is calculated by a rearrangement of Equation (7). Thus, $$\tan(\beta) = \frac{n_1 \sin(\theta_2)}{n_1 \cos(\theta_2) - n_2} \quad (8)$$

Using the above equations and the necessary data, facet angles for a two Fresnel lens, one-piece projection screen can be readily calculated. For example, if the focal length of the field lens is 39 inches, the diameter of the screen is 37 inches and $n_1$ and $n_2$ are 1.59 (for Polystyrene) and 1.49 (for PMMA) respectively, facet surface 304 will have an angle $\alpha$ of approximately 20° and facet surface 312 will have an angle $\beta$ of approximately 62°.

Only about half of the light rays impinging upon the outermost facet surface 106 of the projection screen 100, impinge upon the corresponding facet surface 306 of the projection screen 300, thus greatly reducing the outer edge illumination problems. The efficiency of the screen 300 exceeds that of screen 200 by approximately 8%.

Various modifications of the above-described invention will be apparent to those skilled in the pertinent art, and are intended to be within the scope of the present invention. For example, the projection screen embodying the present invention need not be limited to use in a PTV system, but may be used with other projection systems. Also, the optical power of the field lens need not be divided equally between the two surfaces, and may be divided between more than two surfaces with any desired ratio. Additionally, the optical power of the field lens need not be chosen to collimate the rays from the projection lens.

The composition of the Fresnel lens is not limited to a particular material, and, rather than utilizing rotationally symmetrical Fresnel lenses, the present invention may utilize a field lens comprising cylindrical Fresnel lenses. Also, the present invention is functional even where the optical center of the Fresnel lens is vertically offset from the optical axis of the PTV display arrangement.

We claim:

1. A projection screen comprising
a field lens comprising at least two refractive surfaces separated by a non-adhesive region for focusing light received at said field lens from an image source via an incident medium, and
a screen base coupled to said field lens, one of said refractive surfaces being a boundary of said screen base,
wherein the region separating said refractive surfaces has a refractive index different from that of said incident medium and said screen base.

2. The projection screen of claim 1 wherein said refractive surfaces have common outer edges.

3. A projection screen comprising
a field lens comprising at least two Fresnel lens refractive surfaces having common outer edges for focusing light received at said field lens from an image source via an incident medium, and
a screen base coupled to said field lens, one of said refractive surfaces being a boundary of said screen base,
wherein the region separating said refractive surfaces has a refractive index different from that of said incident medium and said screen base.

4. The projection screen of claim 3 wherein said screen base comprises a diffuser for controlling the vertical spread of the focused light, and a lenticular array coupled to said diffuser for wide-angle distribution of the light received from said diffuser.

5. The projection screen of claim 4 wherein the number of refractive surfaces is 2.

6. The projection screen of claim 5 wherein the optical power of said field lens is divided equally between said refractive surfaces.

7. The projection screen of claim 3 wherein the number of refractive surfaces is 2.

8. The projection screen of claim 3 wherein the optical power of said field lens is divided equally between said refractive surfaces.

9. The projection screen of claim 7 wherein the optical power of said field lens is divided equally between said refractive surfaces.

* * * * *